(12) United States Patent
Bard et al.

(10) Patent No.: US 7,167,931 B2
(45) Date of Patent: Jan. 23, 2007

(54) EXECUTING PROGRAM INSTALLED IN COMPUTER SLOT OF A MACHINE IN ONE OF PLURAL ENVIRONMENTS COMPRISING A MAIN OPERATING SYSTEM AND SMALL OPERATING SYSTEM

(75) Inventors: Steve Bard, Vancouver, WA (US); Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 10/446,445

(22) Filed: May 28, 2003

(65) Prior Publication Data
US 2003/0208676 A1 Nov. 6, 2003

Related U.S. Application Data

(63) Continuation of application No. 09/472,653, filed on Dec. 27, 1999, now Pat. No. 6,604,152.

(51) Int. Cl.
*G06F 13/14* (2006.01)
*G06F 9/00* (2006.01)

(52) U.S. Cl. .................... 710/16; 710/8; 710/10; 710/15; 710/18; 710/102; 710/103; 713/1; 713/2; 713/323; 713/324; 711/115

(58) Field of Classification Search .............. 710/8, 710/10, 15, 16, 18, 102, 103; 713/1, 2, 324, 713/323; 711/115
See application file for complete search history.

(56) References Cited

U.S. PATENT DOCUMENTS

| | | | | |
|---|---|---|---|---|
| 5,136,711 A | * | 8/1992 | Hugard et al. ................. 713/2 |
| 5,359,725 A | * | 10/1994 | Garcia et al. ............... 707/200 |
| 5,636,357 A | * | 6/1997 | Weiner ....................... 711/115 |
| 5,799,187 A | * | 8/1998 | McBrearty ..................... 713/2 |
| 5,887,163 A | * | 3/1999 | Nguyen et al. ................ 713/2 |
| 6,035,396 A | * | 3/2000 | Thompson et al. ............ 713/2 |
| 6,254,477 B1 | * | 7/2001 | Sasaki et al. .................. 463/1 |
| 6,295,564 B1 | * | 9/2001 | Shigetomi et al. ............ 710/74 |
| 6,366,966 B1 | * | 4/2002 | Laney et al. .................. 710/18 |
| 6,367,074 B1 | | 4/2002 | Bates et al. |
| 6,438,649 B1 | * | 8/2002 | Tanaka ....................... 711/115 |
| 6,763,458 B1 | * | 7/2004 | Watanabe et al. ........... 713/100 |

* cited by examiner

*Primary Examiner*—Tammara Peyton
(74) *Attorney, Agent, or Firm*—Fish & Richardson P.C.

(57) ABSTRACT

Executing a program stored on a device inserted into a computer slot includes determining how to execute the program based on configuration data stored on the device, and executing the program in accordance with the configuration data. Determining may include identifying a type of operating system with which to execute the program based on the configuration data. Executing may include executing the program with the identified operating system.

36 Claims, 6 Drawing Sheets

US 7,167,931 B2

EXECUTING PROGRAM INSTALLED IN COMPUTER SLOT OF A MACHINE IN ONE OF PLURAL ENVIRONMENTS COMPRISING A MAIN OPERATING SYSTEM AND SMALL OPERATING SYSTEM

CROSS-REFERENCE TO RELATED APPLICATION

This application is a continuation (and claims the benefit of priority under 35 USC §120) of U.S. application Ser. No. 09/472,653, filed Dec. 27, 1999, now U.S. Pat. No. 6,604, 152. The disclosure of U.S. application Ser. No. 09/472,653 is considered part of (and is incorporated by reference in) the disclosure of this application.

BACKGROUND OF THE INVENTION

This invention relates to executing a program stored on a device installed in a computer slot.

Devices, such as cartridges, can be inserted into computer slots, such as PC (Personal Computer) card slots. Computer programs and data stored on those devices can then be read and/or executed by the computer.

SUMMARY OF THE INVENTION

In general, in one aspect, this invention relates to executing a program stored on a device inserted into a computer slot. This aspect of the invention features determining how to execute the program based on configuration data stored on the device, and executing the program in accordance with the configuration data.

Among the advantages of this aspect of the invention may be one or more of the following. Determining how to execute the program allows the computer to execute the program in a number of different ways. For example, the program can be executed with no operating system, using a small operating system (SOS) such as WindowsCE, or using a main operating system (MOS) such as Windows98. The computer can also determine if the application is to be executed "in place", meaning that it is executed on the device itself, or if the program must be copied to computer memory before execution. By making such determinations beforehand, it is possible to allocate computer resources that are appropriate for the cartridge and, thus, reduce wasted resources.

Other features and advantages will become apparent from the following description, drawings and claims.

DESCRIPTION

Figure 1:
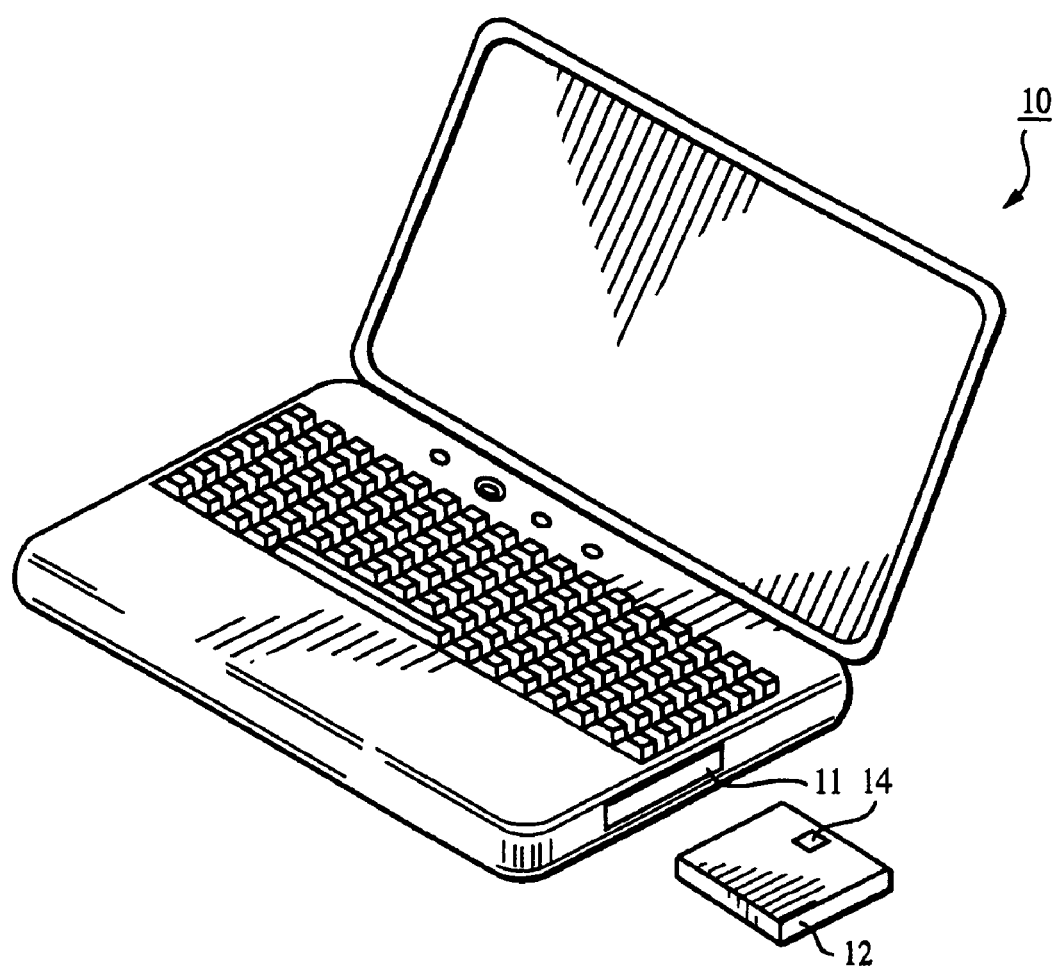
FIG. 1 is a view of a computer on which an embodiment of the invention is implemented.

FIG. 1 shows a notebook computer 10 having a slot 11, into which a cartridge 12 containing data and/or computer program(s) may be inserted. Slot 11 may be a standard PC card slot, a CardBay slot, a Compact Flash slot, or any other type of computer expansion slot.

Cartridge 12 includes a memory 14 which stores configuration data. Memory 14 may be a register, a configuration ROM, or any other type of nonvolatile memory. The configuration data indicates how cartridge 12 is to be used. A slot controller (not shown) in computer 10 reads this configuration data and determines, based on the data, how to read, store and/or execute data on cartridge 12.

For example, the configuration data may specify the type of operating system to be used for executing computer program(s) stored on cartridge 12. In some embodiments, the configuration data may specify that the computer program(s) are to be executed with an SOS, such as WindowsCE, QNX, or VxWorks, or it may specify that the computer program(s) are to be executed with an MOS, such as Windows98.

The configuration data may also specify a location from which program(s) on cartridge 12 are to be executed. For example, the configuration data may specify that the programs are to be executed from cartridge 12 itself (executed in place), or that the program(s) are to be copied to system memory and then executed from there.

Cartridge 12, or portions thereof, may also be used as storage, such as flash memory, for computer 10. In this case, the configuration data may specify that cartridge 12 is to be used as storage. The data may also specify which portions of cartridge 12 are to function as storage.

Figure 2:
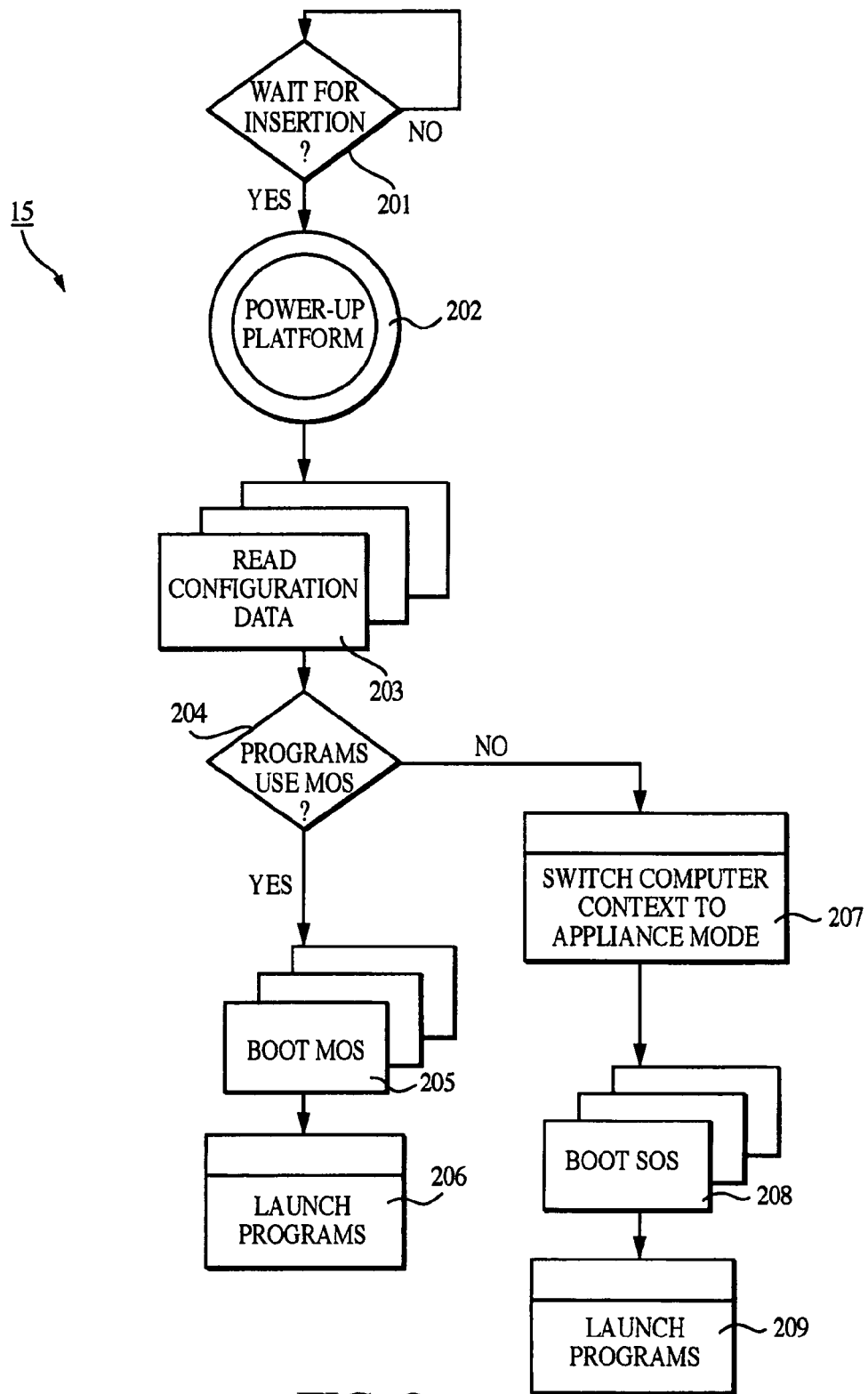
FIG. 2 is a flowchart showing a process for executing program(s) on a cartridge without an operating system currently active.

FIG. 2 shows a process 15 by which the slot controller in computer 10 determines how to use cartridge 12. Process 15 shows a case where there is no active operating system running on computer 10 prior to insertion of cartridge 12. For example, computer 10 may be in a power-down or low-power mode, during which only rudimentary processes, such as process 15, are running.

To begin, process 15 waits (201) for a cartridge to be inserted into slot 11. Once a cartridge 12 has been inserted, process 15 powers-up (202) computer 10 and reads (203) configuration data from cartridge 12. Based on this configuration data, process 15 determines (204) if program(s) stored on cartridge 12 require an SOS or an MOS. If the program(s) require an MOS, process 15 boots (205) the MOS stored on computer 10 and launches (206) the program(s) on cartridge 12 (see FIG. 4). If the program(s) use an SOS, process 15 switches (207) computer 10 to "appliance mode". In appliance mode, computer 10 operates as a stand-alone, single-function device and has limited functionality. For example, in appliance mode, computer 10 executes programs on cartridge 12, performs some rudimentary processes, and little else. Process 15 boots (208) the SOS and launches (209) the program(s) on cartridge 12 (see FIG. 5).

In both SOS and MOS mode, process 15 launches the applications automatically, meaning without user-intervention through a graphical user interface (GUI). Thus, computer 10 appears to the user to have the sole function of the program(s) stored on cartridge 12.

Figure 3:
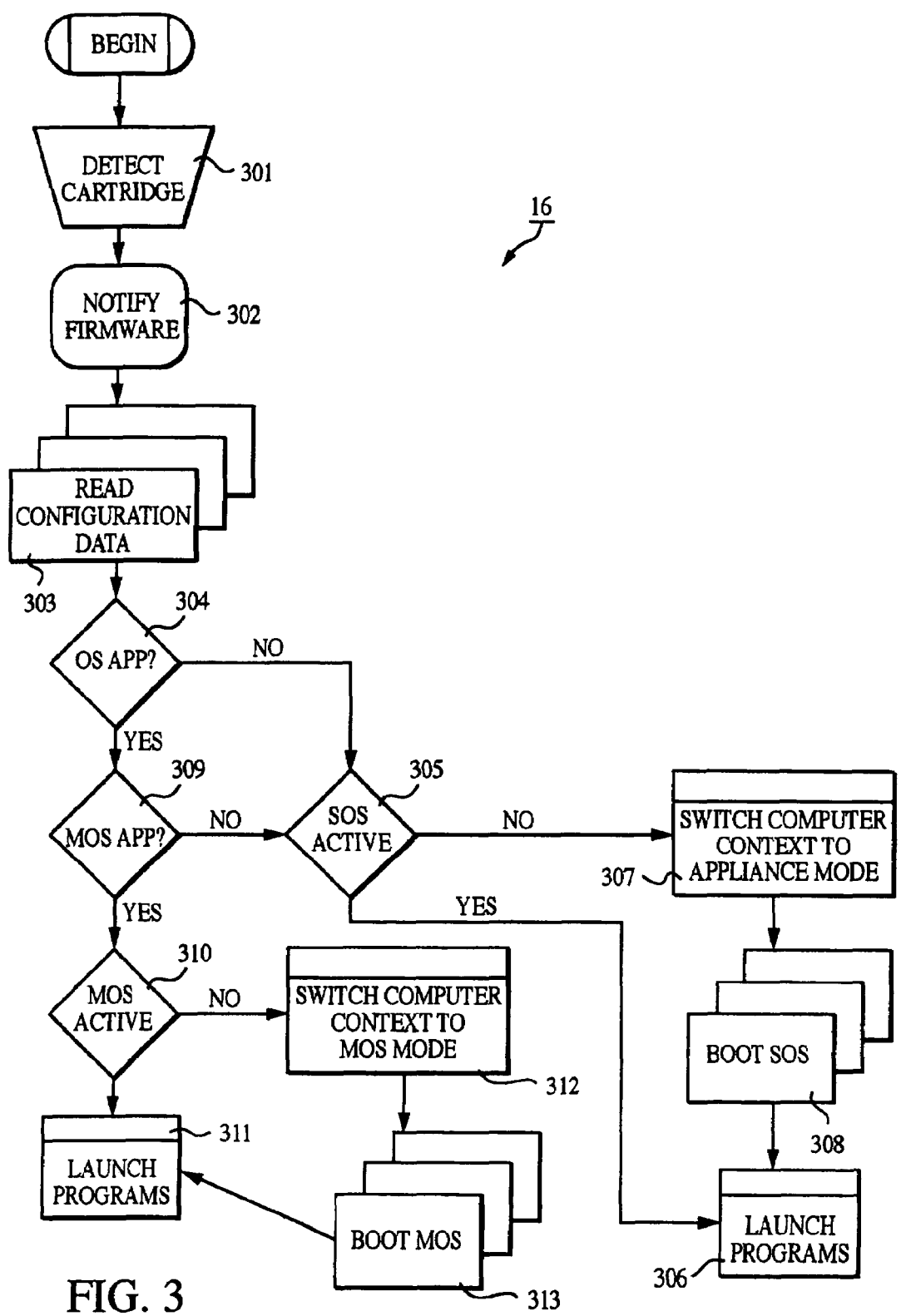
FIG. 3 is a flowchart showing a process for executing program(s) on a cartridge with an operating system currently active.

FIG. 3 shows a process 16 in which there is an active operating system running on computer 10 prior to insertion of cartridge 12. Process 16 begins by detecting (301) a cartridge in slot 11. Once a cartridge has been detected, process 16 notifies (302) firmware in the slot controller (not shown) of computer 10, which performs the remainder of process 16. Process 16 reads (303) the configuration data from cartridge 12 and determines which operating system to use based on this data.

Specifically, process 16 determines (304) if there is a program stored on cartridge 12 that requires an operating system. If not, process 16 determines (305) if an SOS is active. If an SOS is active, process 16 launches (306) program(s) on the cartridge (see FIG. 5). If an SOS is not active, process 16 switches (307) computer 10 to appliance mode, boots (308) the SOS, and launches (306) program(s) on the cartridge.

Following 304, if process 16 determines (309) that there is not a program on cartridge 12 that requires an MOS, process 16 performs 305 to 308, as shown. If there is a program on cartridge 12 that requires an MOS, process 16 proceeds to 310, where it determines if there is currently an MOS active on computer 10. If there is an MOS currently active on computer 10, process 16 launches (311) program(s) on cartridge 12. If there is not an MOS currently active on computer 10 (e.g., if there is an SOS currently active), process 16 switches (312) computer 10 to MOS mode, meaning non-appliance mode, and boots (313) the MOS. Process 16 then launches (311) the program(s) on cartridge 12.

Figure 4:
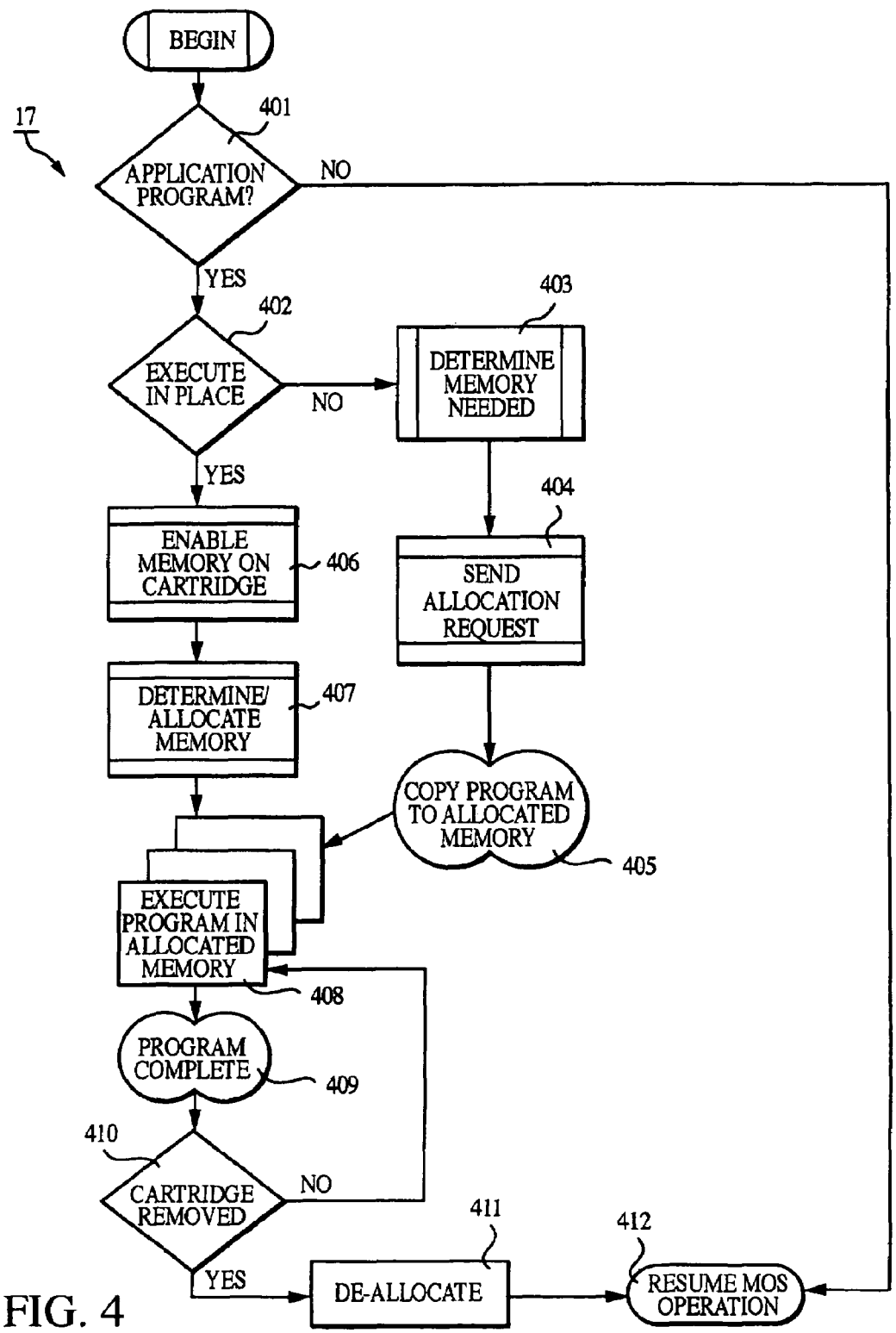
FIG. 4 is a flowchart showing a process for executing the program(s) in an MOS mode.

FIG. 4 shows a process 17 for launching program(s) on cartridge 12 in an MOS environment. Process 17 begins by determining (401) if there is an application program to be executed on cartridge 12. If there is such a program, process 17 determines (402) if the program can be executed from cartridge 12 without an operating system or "executed in place". This information is obtained by reading the configuration data from cartridge 12.

If the program cannot be executed from cartridge 12, process 17 determines (403) an amount of memory needed on computer 10 to execute the program and sends (404) an allocation request to a processor in computer 10 for the required amount of memory. This size of the memory required may be based, e.g., on information in the configuration data and the size of the program(s). Process 17 then copies (405) the program from cartridge 12 to the allocated memory.

Returning to 402, if the program on cartridge 12 can be executed from cartridge 12, process 17 enables (406) memory on cartridge 12 and determines/allocates (407) the amount of memory needed to execute the program. Process 17 then executes (408) the program in the allocated memory space. Once execution of the program has been completed (409) and the cartridge has been removed (410) from slot 11, process 17 de-allocates (411) memory in the MOS for the cartridge program(s) and resumes (412) normal MOS operation. Normal MOS operation also follows if no application program was detected in 411 above.

Figure 5:
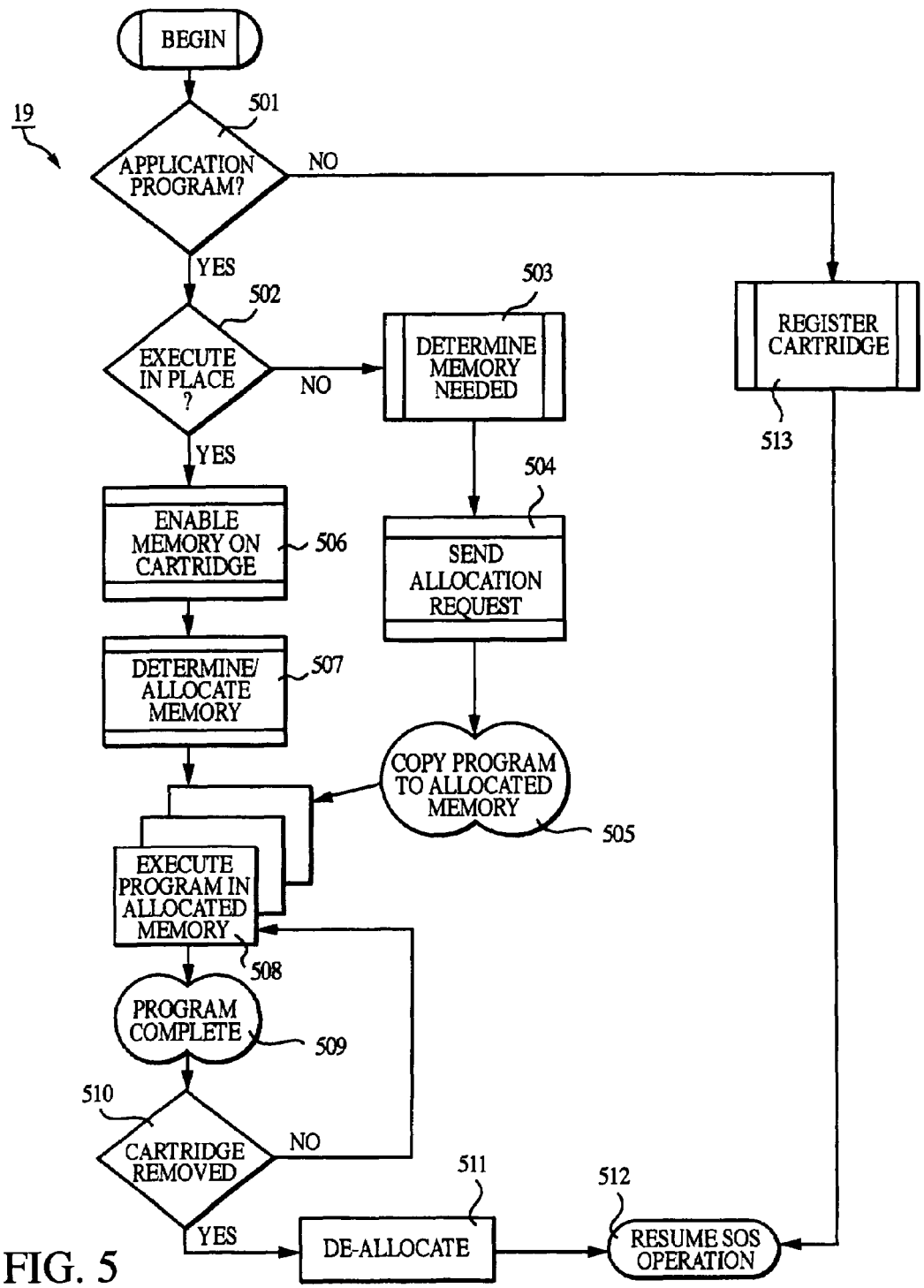
FIG. 5 is a flowchart showing a process for executing the program(s) in an SOS mode.

FIG. 5 shows a process 19 for launching program(s) on cartridge 12 in an SOS environment. Steps 501 to 512 of process 19 are identical to corresponding steps 401 to 412 of process 17, except that an SOS is used in process 19 instead of an MOS. Where the differences lie between processes 17 and 19 is if no application program is detected in 501. In this case, process 19 proceeds to 513. In 513, process 19 registers cartridge 12 with a processor on computer 10 to indicate that the cartridge is available for use as additional (e.g., flash) storage. Thereafter, process 19 resumes normal SOS operations. These operations may include storing data on cartridge 12 when required.

Figure 6:
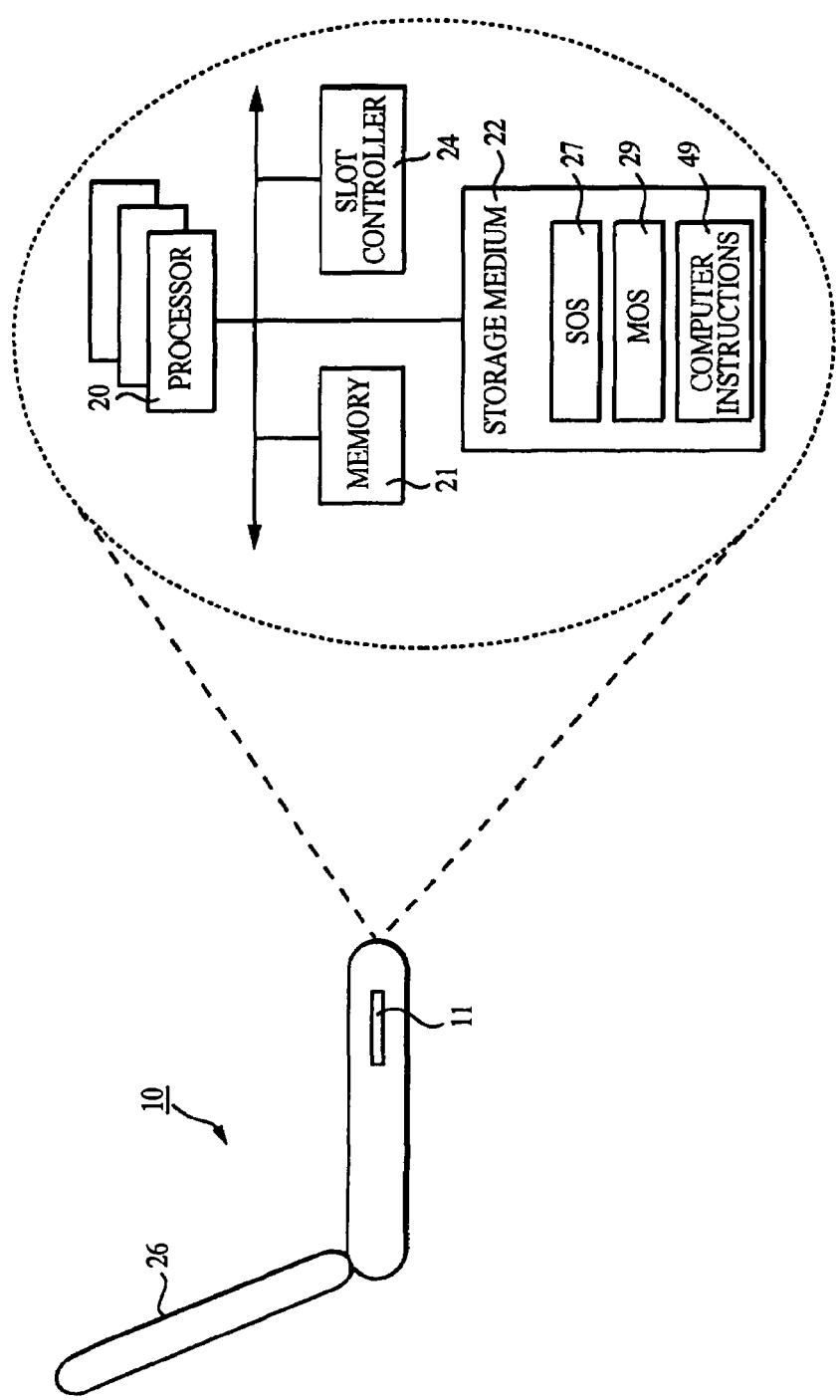
FIG. 6 is a block diagram of components in the computer of FIG. 1.

FIG. 6 shows components of computer 10. Computer 10 includes one or more processors 20, a memory 21, a storage medium 22 (e.g., a hard disk), and a slot controller 24 for detecting cartridges or other devices in a slot 11 (FIG. 1) and for performing processes 15, 16, 17 and/or 19. Storage medium 44 stores computer-executable instructions (firmware) 49 for implementing processes 15, 16, 17 and/or 19, an SOS 27, and an MOS 29. SOS 27 may run on a simple, low-power processor, while MOS 29 may run on a main, higher-power processor.

Processes 15, 16, 17 and/or 19, however, are not limited to use with the hardware or software configuration of FIG. 6; they may find applicability in any computing or processing environment. Processes 15, 16, 17 and 19 may be implemented in hardware, software, or a combination of the two. Processes 15, 16, 17 and 19 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 15, 16, 17 and 19 and to generate output information. The output information may be applied to one or more output devices, such as display screen 26, for viewing by a user.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 15, 16, 17 and 19. Processes 15, 16, 17 and 19 may also be implemented as a computer-readable storage medium, configured with a computer program, where, upon execution, instructions in the computer program cause the computer to operate in accordance with processes 15, 16, 17 and 19.

Other embodiments not described herein are also within the scope of the following claims. For example, the foregoing embodiments have been described in the context of a notebook computer. However, the invention can be applied on any type of computer, including, but not limited to, laptops, desktops, and hand-held devices. The invention is also not limited to use with cartridge-type storage devices. The invention can be used to execute any type of program, from business applications such as spreadsheets to computer games. The invention can also be used with MOS and SOS operating systems other than those described above.

What is claimed is:

1. A method of storing data on a device inserted into a computer slot of a machine, comprising:
   identifying the device as available storage based on information stored on the device;
   storing the data on the device; and
   if there is a computer program on the device, executing the computer program in one of plural environments that the machine supports, the plural environments comprising a main operating system and a small operating system, the small operating system providing limited functionality and the main operating system providing increased functionality relative to the small operating system.

2. The method of claim 1, wherein identifying comprises:
reading configuration data from the device; and
determining if the device comprises available storage based, at least in part, on the configuration data.

3. The method of claim 1, further comprising registering the device with the machine as available storage.

4. An article comprising a machine-readable medium which stores machine-executable instructions to store data on a device inserted into a computer slot of a machine, the instructions causing the machine to:
identify the device as available storage based on information stored on the device;
store the data on the device; and
if there is a computer program on the device, execute the computer program in one of plural environments that the machine supports, the plural environments comprising a main operating system and a small operating system, the small operating system providing limited functionality and the main operating system providing increased functionality relative to the small operating system.

5. The article of claim 4, wherein identifying comprises:
reading configuration data from the device; and
determining if the device comprises available storage based, at least in part, on the configuration data.

6. The article of claim 4, further comprising instructions that cause the machine to register the device as available storage.

7. An apparatus for storing data on a device inserted into the apparatus, comprising:
a memory which stores executable instructions; and
a processor which executes the instructions to (i) identify the device as available storage based on information stored on the device, (ii) store the data on the device, and (iii) if there is a computer program on the device, execute the computer program in one of plural environments that the apparatus supports, the plural environments comprising a main operating system and a small operating system, the small operating system providing limited functionality and the main operating system providing increased functionality relative to the small operating system.

8. The apparatus of claim 7, wherein identifying comprises:
reading configuration data from the device; and
determining if the device comprises available storage based, at least in part, on the configuration data.

9. The apparatus of claim 7, wherein the processor executes instructions to register the device as available storage.

10. A method for use with a device inserted into a slot of a machine, comprising:
reading configuration data from the device, the configuration data specifying at least one of (i) an environment to execute a computer program, and (ii) whether at least a portion of the device can be used as data storage for the machine; and
registering the device with the machine as available data storage in a case that at least a portion of the device can be used as data storage for the machine;
wherein the environment comprises one of plural environments in which to execute the computer program, the plural environments being supported by the machine and comprising a main operating system and a small operating system, the small operating system providing limited functionality and the main operating system providing increased functionality relative to the small operating system.

11. The method of claim 10, wherein the environment also comprises a location from which to execute the computer program.

12. The method of claim 11, wherein the location comprises one of the device and a memory on the machine.

13. The method according to claim 10, further comprising:
storing data on the portion of the device that can be used as data storage for the machine.

14. The method according to claim 10, wherein the portion of the device that can be used as data storage for the machine comprises either an entire storage capacity of the device or less than the entire storage capacity of the device.

15. The method of claim 10, wherein the device comprises a cartridge and the machine comprises a computing device.

16. A method for use with a device inserted into a slot of a machine, comprising:
determining if there is a computer program on the device;
registering the device with the machine as available data storage if there is no computer program on the device; and
executing the computer program in one of plural environments if there is a computer program on the device, the plural environments being supported by the machine and comprising a main operating system and a small operating system, the small operating system providing limited functionality and the main operating system providing increased functionality relative to the small operating system.

17. The method of claim 16, further comprising:
storing data from the machine on the device following registering.

18. The method of claim 16, wherein the device comprises a cartridge and the machine comprises a computing device.

19. An article comprising a readable medium that stores executable instructions, the instructions for use with a device inserted into a slot of a machine, the instructions causing the machine to:
read configuration data from the device, the configuration data specifying at least one of (i) an environment to execute a computer program, and (ii) whether at least a portion of the device can be used as data storage for the machine; and
register the device with the machine as available data storage in a case that at least a portion of the device can be used as data storage for the machine;
wherein the environment comprises one of plural environments in which to execute the computer program, the plural environments being supported by the machine and comprising a main operating system and a small operating system, the small operating system providing limited functionality and the main operating system providing increased functionality relative to the small operating system.

20. The article of claim 19, wherein the environment also comprises a location from which to execute the computer program.

21. The article of claim 20, wherein the location comprises one of the device and a memory on the machine.

22. The article according to claim 19, further comprising instructions that cause the machine to:
store data on the portion of the device that can be used as data storage for the machine.

23. The article according to claim 19, wherein the portion of the device that can be used as data storage for the machine comprises either an entire storage capacity of the device or less than the entire storage capacity of the device.

24. The article of claim 19, wherein the device comprises a cartridge and the machine comprises a computing device.

25. An article comprising a readable medium that stores executable instructions, the instructions for use with a device inserted into a slot of a machine, the instructions causing the machine to:
determine if there is a computer program on the device;
register the device with the machine as available data storage if there is no computer program on the device; and
execute the computer program in one of plural environments if there is a computer program on the device, the plural environments being supported by the machine and comprising a main operating system and a small operating system, the small operating system providing limited functionality and the main operating system providing increased functionality relative to the small operating system.

26. The article of claim 25, further comprising instructions that cause the machine to:
store data from the machine on the device following registering.

27. The article of claim 25, wherein the device comprises a cartridge and the machine comprises a computing device.

28. A system comprising:
a machine comprising a slot controller, memory and a slot, the memory storing instructions that are executed by the slot controller; and
a device that mates to the slot in the machine;
wherein the slot controller executes the instructions to:
read configuration data from the device, the configuration data specifying at least one of (i) an environment to execute a computer program, and (ii) whether at least a portion of the device can be used as data storage for the machine; and
register the device with the machine as available data storage in a case that at least a portion of the device can be used as data storage for the machine;
wherein the environment comprises one of plural environments in which to execute the computer program, the plural environments being supported by the machine and comprising a main operating system and a small operating system, the small operating system providing limited functionality and the main operating system providing increased functionality relative to the small operating system.

29. The system of claim 28, wherein the environment also comprises a location from which to execute the computer program.

30. The system of claim 29, wherein the location comprises one of the device and a memory on the machine.

31. The system according to claim 28, wherein the slot controller executes instructions to store data on the portion of the device can be used as data storage for the machine.

32. The system according to claim 28, wherein the portion of the device that can be used as data storage for the machine comprises either an entire storage capacity of the device or less than the entire storage capacity of the device.

33. The system of claim 28, wherein the device comprises a cartridge and the machine comprises a computing device.

34. A system comprising:
a machine comprising a slot controller, memory and a slot, the memory storing instructions that are executed by the slot controller; and
a device that mates to the slot in the machine;
wherein the slot controller executes the instructions to:
determine if there is a computer program on the device;
register the device with the machine as available data storage if there is no computer program on the device; and
execute the computer program in one of plural environments if there is a computer program on the device, the plural environments being supported by the machine and comprising a main operating system and a small operating system, the small operating system providing limited functionality and the main operating system providing increased functionality relative to the small operating system.

35. The system of claim 34, wherein the slot controller executes instructions to store data from the machine on the device following registering.

36. The system of claim 34, wherein the device comprises a cartridge and the machine comprises a computing device.

* * * * *